Feb. 15, 1955

C. R. MILLER 2,702,057

MOBILE CHAIN SAW LOG RIPPING UNIT

Filed Feb. 9, 1953

INVENTOR.
Charles R. Miller
BY
Townsend, Townsend & Hoppe

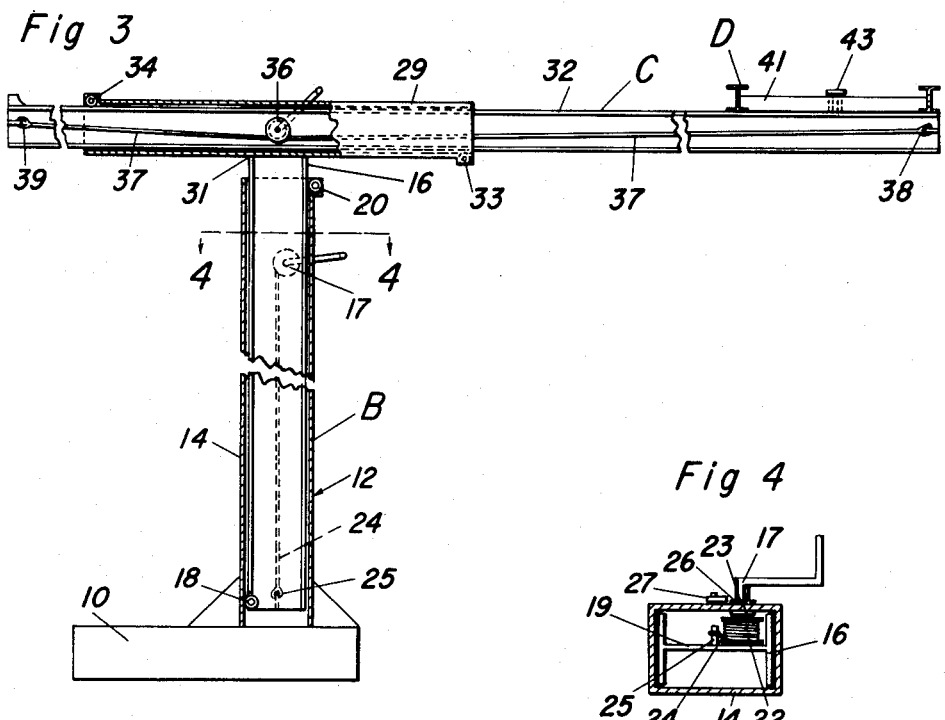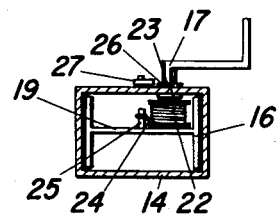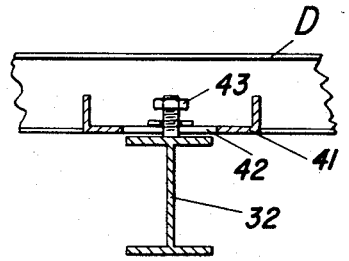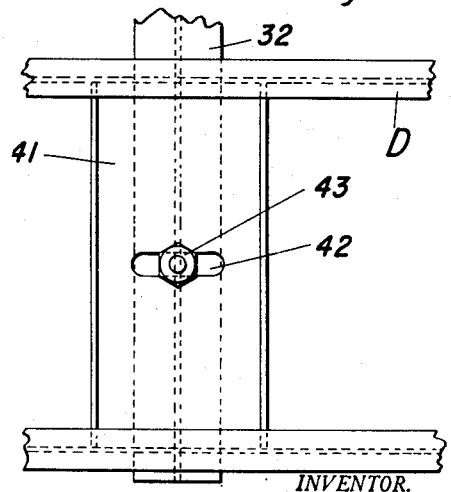

Feb. 15, 1955    C. R. MILLER    2,702,057
MOBILE CHAIN SAW LOG RIPPING UNIT
Filed Feb. 9, 1953    3 Sheets-Sheet 3
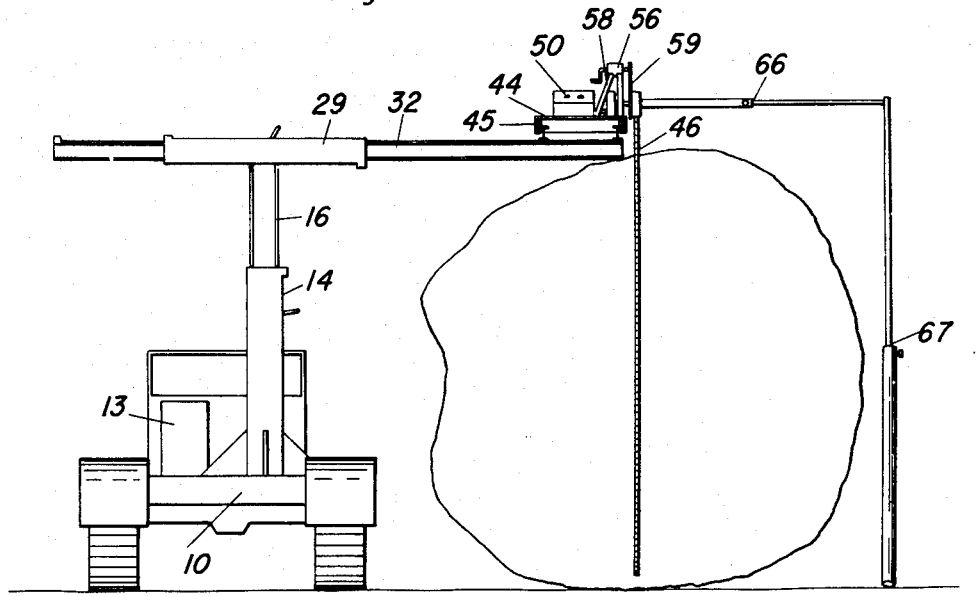
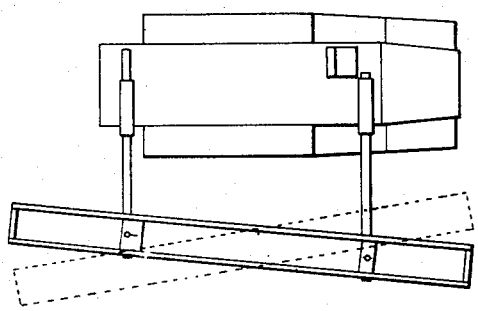
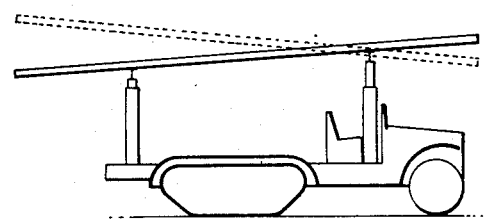
INVENTOR.
Charles R. Miller
BY
Townsend, Townsend + Hoppe

United States Patent Office 2,702,057
Patented Feb. 15, 1955

2,702,057

MOBILE CHAIN SAW LOG RIPPING UNIT

Charles R. Miller, Arcata, Calif.

Application February 9, 1953, Serial No. 335,745

7 Claims. (Cl. 143—32)

This invention relates to a new and improved mobile log ripping unit.

Log ripping units of the type illustrated in the drawings, and to be hereinafter described in greater detail, have been found to be particularly useful in halving or quartering relatively large diameter logs in the field and at the site where said logs are originally felled. More particularly, the present unit has been found to have particular utility in logging operations in the redwood forests of the Pacific Northwest part of the United States in providing a means for ripping large diameter redwood logs lengthwise into halves or quarters at their situs of cutting and prior to their transportation to a permanent mill site. In this connection, it is pointed out that there are several reasons why it is frequently necessary or desirable to halve or quarter large diameter logs in the field before they are transported to the mill. One reason is that the loading and transporting equipment in use at a particular site may render it difficult, if indeed not impossible, to handle and transport logs over a certain diameter or tonnage.

A second reason is that individual state highway laws may impose limits on the maximum single log diameter which can be transported over public roads or highways. Thus, for example, California laws relating to maximum permissible heights of loaded vehicles on state highways effectively limit the maximum diameter of a single log which can be legally transported with conventional hauling equipment to eight feet. Accordingly, logs which exceed a diameter of about eight feet must be split in the field prior to transportation on the highways—it being further noted that the larger redwood logs range in diameter from eight to twenty-four feet.

Still a third reason why it frequently becomes necessary to halve or quarter logs in the field is that the route to be traveled from the cutting site to the mill may include underpasses, bridges, or other overhead structures having limited vertical clearances, which makes it essential that the maximum height of a given truck load not exceed the permissible vertical clearance of the road route to be followed.

In Pacific Northwest redwood logging operations it is more or less standard practice for loggers to employ dynamite or other high explosives to split lengthwise the larger redwood logs which cannot, for one reason or another, be moved in toto from the forest site where they are felled to a mill. A principal disadvantage attendant with said practices is that almost invariably the splitting of a log by explosives results in a very considerable destruction and waste of timber, and particularly in loss of production of high-grade vertical grain lumber.

It is a principal object, therefore, of the present invention to provide a mobile log ripping unit maneuverable in the field at the situs where the trees are felled, and which is capable of halving or quartering practically any size log in its felled position on the ground with a minimum waste of timber, and with resultant increase in volume of vertical grain lumber over conventional practices.

Another principal object of the invention is to provide a mobile sawing unit of the character briefly mentioned and which incorporates novel means for supporting sawing means whereby said means can be adjusted vertically and horizontally with respect to a given log so as to insure sawing of the log along a desired line of cut or axis and with practically no waste of timber.

Other objects and advantages of the present invention will become apparent upon reading the following specification and referring to the accompanying drawings in which similar characters of reference represent corresponding parts in each of the several views.

In the drawings:

Fig. 3 is an enlarged fragmentary view of the rear vertically and horizontally adjustable saw carriage supporting means.

Fig. 4 is a sectional view taken on line 4—4 of Fig. 3.

Fig. 5 is an enlarged fragmentary view taken on line 5—5 of Fig. 2.

Fig. 6 is an enlarged fragmentary view taken on line 6—6 of Fig. 1.

Fig. 7 is an end elevational view of the unit shown in sawing position with relation to a log.

Fig. 8 is a schematic plan view of the unit showing the lengthwise adjustability of the horizontal supporting arms.

Fig. 9 is a schematic view of the unit illustrating how opposite ends of the saw carriage can be adjusted at different heights.

Figure 1:
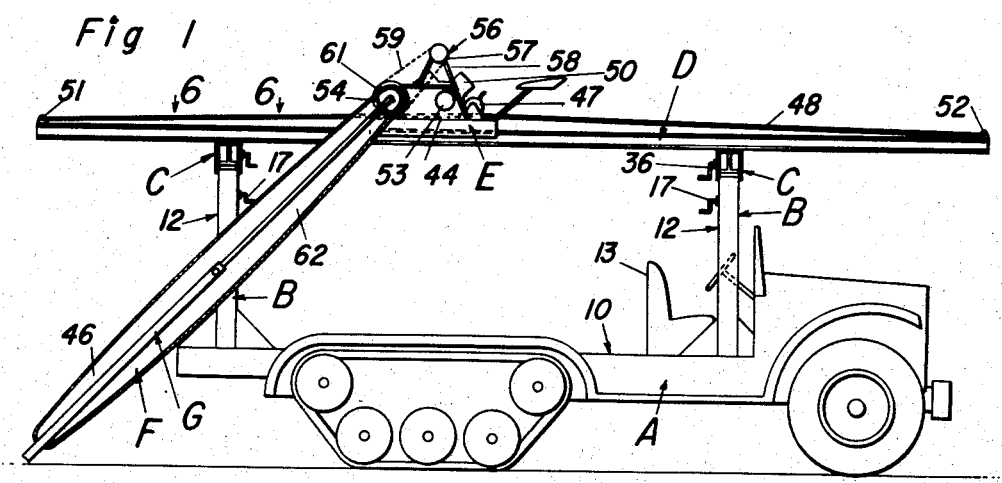
Fig. 1 is a side elevational view of a mobile log ripping unit embodying the invention.
Figure 2:
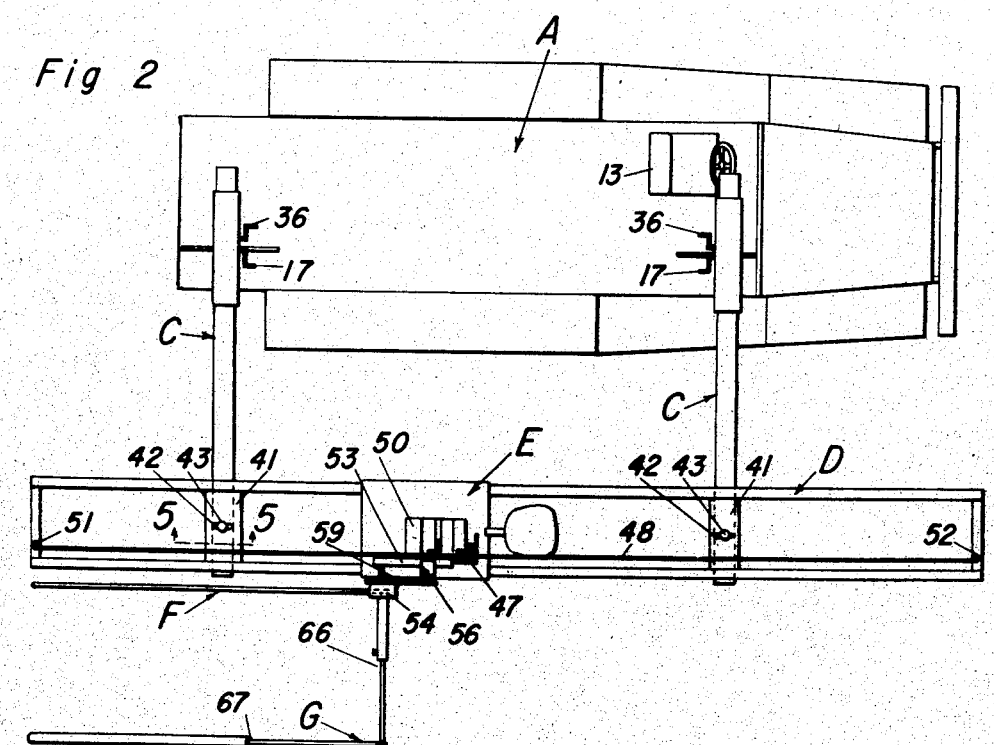
Fig. 2 is a top plan view of the same.

Referring now more particularly to the drawings, the mobile log ripping unit therein shown comprises, generally, a vehicle carrier A, vertically adjustable supporting means B, horizontally adjustable supporting means C, saw carriage supporting trackways D, saw carriage E, chain saw gauge assembly F, and saw guide means G.

The vehicle carrier, heretofore designated generally at A, comprises a suitable self-powered conveyance capable of propelling itself over relatively rough terrain whereby it may be driven and maneuvered in and about the timber felling area. The vehicle carrier shown in the drawings comprises a half-track type vehicle having a relatively long flat supporting bed, indicated at 10. It is understood, however, that any suitable type self-propelled vehicle having a sufficiently strong chassis to support the carriage and its associated supporting assemblies might be utilized according to individual desires or needs.

The vertically adjustable support means, heretofore designated generally at B, comprises, essentially, a pair of spaced vertically adjustable fore-and-aft standards, indicated generally at 12. Each of the standards 12 are rigidly and securely anchored to the bed 10 of the vehicle carrier and are preferably located to the right of the driver's compartment 13 so as not to interfere with normal driving operations of the vehicle. Each of the vertical standards may be considered as being substantially identical in construction.

More specifically, each standard comprises an outer rectangular casing 14 which is rigidly anchored to the bed of the carrier, as aforesaid, and each casing 14 slidably mounts a lift ram 16 (Figs. 3 and 4) which may be vertically adjustably moved to desired height by an associated winch and cable mechanism 17. Ram 16 may comprise an I-beam 19, carrying a roller bearing 18 at its lower inboard corner, which is adapted to bear against the adjacent inner side of casing 14 when said ram is vertically raised or lowered within said casing 14. A second roller bearing 20 is mounted adjacent the top outboard side of casing 14 which functions as a second bearing point along which the lift ram rides during raising or lowering movement thereof.

The winch means, heretofore indicated at 17, for adjustably raising and lowering ram 16 within casing 14, comprises more specifically a crank-operated cable drum 22 journaled as at 23 to casing 14 and about which is wound a winch cable 24. The free end of cable 24, in turn, is anchored as at 25 to the lower end of ram 16. It is readily seen that winding or unwinding of cable 24 about the winch drum will cause corresponding raising or lowering of the ram within casing 14. A suitable pinion 26 keyed on the cable drum shaft may be provided in conjunction with associated pawl 27 pivoted to the exterior of casing 14 to permit locking of the vertical ram at any desired adjusted height.

Each of the rams 16 supports an associated horizontally adjustable supporting arm assembly, heretofore designated at C. Each horizontal arm assembly is shown as comprising, more specifically, a rectangular casing or housing 29 rigidly mounted, as at 31, to the top of an associated ram 16. Each of the housings 29 slidably supports a horizontal arm comprising an I-beam 32. In this connection, roller bearings, such as indicated at 33 and 34, respectively, are preferably provided at the outboard lower end and at the inboard upper end of each housing 29 so as to provide diagonally opposed, substantially frictionless bearing surfaces for slidable movement of arm 32 within said housing.

Each of the horizontal supporting arm assemblies may be individually adjustably operated by providing winch and cable assemblies, such as indicated at 36, each of which comprises a crank-operated cable drum journaled to the side of housing 29, and about which is wound a cable 37 having its ends secured to opposite ends of arm 32, such as indicated at 38 and 39. Crank rotation of either winch assembly 36 will, of course, cause corresponding inward or outward horizontal movement of an associated arm 32, depending on the direction of cable winding.

The saw carriage supporting trackways, heretofore indicated generally at D, comprise, more specifically, a pair of spaced parallel I-beams rigidly joined together by a pair of spacer bars 41. Each spacer bar, in turn, is formed with an enlarged aperture or slot 42 adapted to be loosely engaged by an upwardly projecting associated threaded stud 43 provided on the outer end of an associated arm 32. More specifically, the size of the apertures 42 is preferably made substantially larger than the diameter of studs 43, whereby the studs fit loosely within the apertures to establish in effect universal coupling between the carriage trackways and the horizontal support arms. The reason for this preferred arrangement will be explained in more detail hereinafter.

The saw carriage, heretofore indicated generally at E, comprises, more specifically, a chassis 44 provided with suitable track engaging wheels or bearings 45. The carriage chassis also is adapted to support and carry a prime mover, such as a gasoline engine 50 for supplying driving power to chain saw 46.

In this connection, a suitable winch drum 47, about which is wound a cable 48, may be provided as a means for moving the carriage along the trackways. More specifically, cable drum 47 mounted on the carriage and having cable connections to opposite ends of the trackways such as indicated at 51 and 52, may be crank operated so as to cause the said carriage to move either backwardly or forwardly along said trackways according to the direction in which the winch is rotated.

Chain saw 46 may be of conventional construction and of practically any desired length, as, for example, from 10 to 16 feet or longer, depending on the diameter of the logs to be ripped. The power saw 46 is driven through suitable conventional gearing 53 connecting chain drive sprocket 54 with engine 50.

The chain saw is mounted to the carriage whereby an operator may swing it upwardly or downwardly so as to move the blade swingably in a vertical plane into and out of cutting engagement with respect to a log, and to regulate the depth of cut of the saw through the log.

Manually raising and lowering of the chain saw may be accomplished by means of a chain-sprocket assembly, such as indicated at 56. This assembly may comprise a crank-operated driving sprocket 57 journaled to supporting standards 58 and connected via chain 59 to a driven sprocket 61 rigidly secured to chain bar 62 of the chain saw 46. Crank rotation of sprocket 57 will, through its chain connection with sprocket 61, cause corresponding raising or lowering of the chain saw.

In operation, the vehicle carrier is moved into position alongside of and generally parallel to a log to be cut. The vertical and horizontal support assemblies are then individually adjusted through operation of their respectively associated winch drive assemblies 17 and 36 so as to move the outer carriage supporting track over the log and in substantial alignment with the medial lengthwise axis of said log. More specifically, the vertical adjustable standards are individually regulated so as to move the outer ends of horizontal arms 32 which support the carriage trackway to a resting position on top of the log, see Fig. 7, and at the same time the horizontal bars 32 are independently adjusted to move the said outer trackway into approximate alignment with medial lengthwise axis of the log, whereby when the carriage is moved along the trackway, the chain saw will rip the log substantially down its said medial lengthwise axis. In view of the fact that the trackways are supported by universal couplings comprising associated studs and apertures 42 and 43, respectively, opposite ends of the carriage trackways may be vertically adjusted at different heights so as to rest in firm resting position along the top surface of the log even though the log may not be lying on perfectly flat ground. Similarly, the horizontal bars 32 may be independently adjusted so as to extend outboard from the vehicle carrier at different lengths to permit accurate alignment of the trackways relative to the medial lengthwise axis of the log, even though the vehicle carrier itself may not be aligned in near precise parallel alignment with the log. Figs. 8 and 9 illustrate schematically the vertical and horizontal adjustability of the saw carriage. By resting and supporting the trackways directly on top of the log, stability of the unit during sawing operations is greatly enhanced.

After the saw unit has been initially positioned and adjusted, the chain saw 46 is swung into rip-sawing engagement with the log, and as the sawing progresses, the operator through operation of winch assembly 47 may move the entire saw carriage along the trackways corresponding to the speed at which the saw rips through the log.

As heretofore mentioned, it is an object of the invention to provide a mobile unit which can be driven to and maneuvered in the field where timber felling operations are taking place so as to halve or quarter the logs in the position that they have been felled and as they lie on the ground.

In order that an operator can visually gauge the depth of saw cut into the log, and in order to provide some means for indicating to an operator the approximate relative position of the end of the chain saw with respect to the ground during the saw's cut through the wood, guide means, such as heretofore indicated generally at G, may be provided. More specifically, said guide means is shown as comprising an L-shaped structure comprising a first leg 66 secured to the chain bar 46 adjacent the upper end of said bar and extending laterally outwardly therefrom, and a second leg 67 extending from the outer end of the first leg perpendicular thereto and in substantial parallel alignment with respect to the chain saw. Preferably, both the first and the second bars comprise adjustably telescopic members, whereby the respective lengths of each can be adjustably regulated. In operation, the first leg is adjusted in length so as to extend outwardly beyond the outer side extremities of the log whereby, when the carriage is moved along the trackway during sawing operations, the second arm carried by the first arm will move along the outer side of the log in parallel movement to the saw blade through the log. The length of the second arm can be adjusted to extend a slight distance below the chain saw so that an operator, by observing the relative position of the lower end of the second arm with respect to the ground surface on which the log lies, is enabled to gauge the approximate depth of cut of the chain saw into the log. In this regard, it is desirable to regulate the depth of cut so that the chain saw never saws completely through the underside of the log into contact with the ground—it being noted that serious damage to the chain saw might result if it were permitted to strike or operate through rocky soil, for example.

In ripping a large diameter log employing the present unit and after a partial rip has been made and before the log has been completely sawed in half, it is desirable to releasably chain the sawed halves of the log together so that when the saw rip is completed, the chain will prevent the two halves of the log from suddenly spreading and striking against the carrier unit parked against the log. After the unit has been driven a safe distance away, the chain may be released and the log halves permitted to fall apart from one another.

It is understood that the embodiment of the invention illustrated in the drawings, and described hereinabove, may be modified in many of its particulars without departing from the scope of the invention. Thus, for example, it is contemplated that hydraulically actuated vertical ram and horizontal supporting arm assemblies could be substituted in lieu of the cable operated mechanisms hereinabove indicated generally at B and C.

It is to be further understood that numerous other modifications and changes might be made without depart-

I claim:

1. A mobile log ripping unit comprising in combination with a vehicle carrier having a supporting bed: spaced fore-and-aft vertically disposed and independently vertically adjustable standards anchored to said bed and projecting upwardly therefrom; first and second spaced, substantially parallel, horizontal arms respectively supported adjacent the upper ends of said fore-and-aft standards and extending laterally outwardly to one side of said vehicle carrier; each arm being individually adjustably extensible in the direction of its own length; a saw carriage supporting trackway coupled to and supported adjacent its opposite ends by said first and second arms; the couplings securing said trackway to said arms arranged and constructed to permit at least limited universal movement of said trackway with respect to said supporting arms whereby said fore-and-aft vertical standards may be adjusted to different heights and whereby said horizontal arms may be adjusted at different lengths; a saw carriage mounted for movement along said trackway; and depending log ripping means carried by said carriage and movable therewith along said trackway.

2. A unit according to claim 1 and wherein each said vertical standard and each said horizontal arm comprises an adjustable winch operated mechanism.

3. A unit according to claim 1 and wherein said log ripping means comprises a chain saw supported pivotally on said carriage for adjustable swingable upward and downward movement.

4. A unit according to claim 1 and wherein said log ripping means comprises a chain saw supported pivotally on said carriage for adjustable swingable upward and downward movement, and wherein gauge means associated with said chain saw are provided for visually gauging the depth of saw cut within a log being cut.

5. A unit according to claim 1 and wherein said log ripping means comprises a chain saw supported pivotally on said carriage for adjustable swingable upward and downward movement, a gauge assembly comprising a generally L-shaped structure, one leg of said structure secured to the chain bar of said chain saw adjacent its upper end and extending laterally outwardly a substantial distance therefrom, the second leg of said structure extending from the outer end of said first leg in spaced substantially parallel alignment with respect to said chain saw to a point extending below the depending end of said chain saw whereby an operator is enabled to gauge the depth of saw cut within a log by reference to the relative location between the depending end of said second leg and the ground surface.

6. A mobile log ripping unit comprising in combination with a mobile vehicle carrier having a supporting bed: means carried by said vehicle bed for suspending a saw carriage trackway laterally outwardly from said vehicle carrier and above a ground surface adjacent said vehicle; said suspension means including vertically and horizontally adjustable means for supporting opposite ends of said trackway at different selective heights above the ground and at different selective distances laterally outwardly from said vehicle carrier; and a saw carriage carrying a saw mounted for movement along said trackway and adapted to engage a log on the ground surface directly below said saw.

7. In mobile log ripping equipment and in combination with a trackway suspended above the ground surface on which a felled log is adapted to be split, a saw carriage mounted for movement along said trackway, a depending chain saw having its upper end mounted pivotally on said carriage for adjustable upward and downward swingable movement to regulate the depth of cut through a log lying on the ground beneath said trackway, a gauge assembly comprising a generally L-shaped structure, one leg of said structure secured to the chain bar of said chain saw adjacent its upper end and extending laterally outwardly a substantial distance therefrom, the second leg of said structure extending from the outer end of said first leg in spaced substantially parallel alignment with respect to said chain saw to a point extending below the depending end of said chain saw whereby an operator is enabled to gauge the depth of saw cut within a log by reference to the relative location between the depending end of said second leg and the ground surface.

References Cited in the file of this patent

UNITED STATES PATENTS

| | | |
|---|---|---|
| 247,726 | Whipple | Sept. 27, 1881 |
| 1,415,247 | Knowles | May 9, 1922 |

FOREIGN PATENTS

| | | |
|---|---|---|
| 540,098 | Germany | Dec. 9, 1931 |
| 593,941 | Germany | Mar. 7, 1934 |
| 679,667 | Germany | Aug. 10, 1939 |